(12) United States Patent
Cox et al.

(10) Patent No.: US 9,340,303 B2
(45) Date of Patent: May 17, 2016

(54) AIRCRAFT GATE PARKING AND SERVICING METHOD

(71) Applicants: Joseph J. Cox, Portland, OR (US); Jan Vana, Prague (CZ); Rodney T. Cox, North Plains, OR (US); Isaiah W. Cox, London (GB)

(72) Inventors: Joseph J. Cox, Portland, OR (US); Jan Vana, Prague (CZ); Rodney T. Cox, North Plains, OR (US); Isaiah W. Cox, London (GB)

(73) Assignee: Borealis Technical Limited, Gibraltar (GI)

( * ) Notice: Subject to any disclaimer, the term of this patent is extended or adjusted under 35 U.S.C. 154(b) by 0 days.

(21) Appl. No.: 14/329,498

(22) Filed: Jul. 11, 2014

(65) Prior Publication Data

US 2015/0353207 A1 Dec. 10, 2015

Related U.S. Application Data

(60) Provisional application No. 61/845,989, filed on Jul. 13, 2013.

(51) Int. Cl.
*E01D 15/00* (2006.01)
*B64F 1/22* (2006.01)
*B64F 1/315* (2006.01)
*B64C 25/40* (2006.01)
*B64F 1/305* (2006.01)
*B64F 1/00* (2006.01)

(52) U.S. Cl.
CPC ............... *B64F 1/22* (2013.01); *B64C 25/405* (2013.01); *B64F 1/00* (2013.01); *B64F 1/225* (2013.01); *B64F 1/305* (2013.01); *B64F 1/315* (2013.01)

(58) Field of Classification Search
CPC ......... B64C 25/405; B64F 1/22; B64F 1/225; B64F 1/305; B64F 1/315

USPC ................................................. 14/71.5, 72.5
See application file for complete search history.

(56) References Cited

U.S. PATENT DOCUMENTS

| | | | | |
|---|---|---|---|---|
| 2,875,457 A | * | 3/1959 | Read | B64F 1/3055 104/20 |
| 2,933,149 A | * | 4/1960 | Lee | 182/78 |
| 3,110,048 A | * | 11/1963 | Bolton | 14/71.5 |
| 3,184,772 A | * | 5/1965 | Moore et al. | 14/71.5 |
| 3,521,316 A | | 7/1970 | Adams et al. | |
| 3,538,529 A | * | 11/1970 | Breier | B64F 1/3055 14/71.5 |
| 3,730,359 A | * | 5/1973 | Andersson | 414/392 |

(Continued)

FOREIGN PATENT DOCUMENTS

| | | |
|---|---|---|
| WO | 9942365 A1 | 8/1999 |
| WO | 2012174572 A1 | 12/2012 |

*Primary Examiner* — Raymond W Addie

(57) ABSTRACT

An improved aircraft gate parking and servicing method is provided, wherein an aircraft is maneuvered into an airport terminal gate and parked in an optimum orientation at an angle that facilitates maximum access to aircraft front and rear doors. Boarding bridges are designed to facilitate connection to doors located rear of an aircraft wing without extending over the aircraft wing to maximize efficiency of passenger transfer. Passenger transfer and servicing of the aircraft may occur concurrently before the aircraft is maneuvered out of its optimum orientation in the parking space and driven to a takeoff runway for departure. Required safety margins are maintained at all times during aircraft maneuvers into and out of the optimum parking orientation. Stairs may be provided to simultaneously access aircraft doors not connected to boarding bridges. In a preferred embodiment, aircraft are moved to an optimum parking location by engines-off electric taxi systems.

12 Claims, 2 Drawing Sheets

(56) References Cited

U.S. PATENT DOCUMENTS

| | | | |
|---|---|---|---|
| 3,916,588 A | 11/1975 | Magill | |
| 4,620,339 A | 11/1986 | Shepheard | |
| 5,149,017 A | 9/1992 | McEntire et al. | |
| 5,505,237 A | 4/1996 | Magne | |
| 6,478,743 B1 * | 11/2002 | Jordfald et al. | 600/462 |
| 6,526,615 B1 * | 3/2003 | Hutton | B64F 1/3055 14/71.5 |
| 6,657,334 B1 | 12/2003 | Edelson | |
| 6,672,221 B2 | 1/2004 | Hadley | |
| 6,838,791 B2 | 1/2005 | Edelson | |
| 6,874,735 B1 * | 4/2005 | Audyli | B64F 1/358 244/137.1 |
| 6,914,542 B2 | 7/2005 | Hutton | |
| 6,929,217 B2 * | 8/2005 | Greaves et al. | 244/114 R |
| 7,039,978 B2 | 5/2006 | Hutton | |
| 7,116,019 B2 | 10/2006 | Edelson | |
| 7,275,715 B2 | 10/2007 | McCoskey et al. | |
| 7,469,858 B2 | 12/2008 | Edelson | |
| 7,614,585 B2 | 11/2009 | McCoskey et al. | |
| 2002/0104176 A1 * | 8/2002 | Thomas et al. | 14/71.5 |
| 2004/0148716 A1 | 8/2004 | Hutton | |
| 2005/0198750 A1 * | 9/2005 | Spencer et al. | 14/71.5 |
| 2006/0273686 A1 | 12/2006 | Edelson | |
| 2007/0252037 A1 | 11/2007 | Greaves | |
| 2009/0184587 A1 * | 7/2009 | Fernandez Diaz et al. | 307/145 |
| 2013/0057414 A1 | 3/2013 | Nutaro et al. | |
| 2014/0114557 A1 * | 4/2014 | Nutaro et al. | 701/121 |
| 2014/0124617 A1 * | 5/2014 | Christensen et al. | 244/50 |
| 2014/0332622 A1 * | 11/2014 | Charles et al. | 244/50 |

* cited by examiner

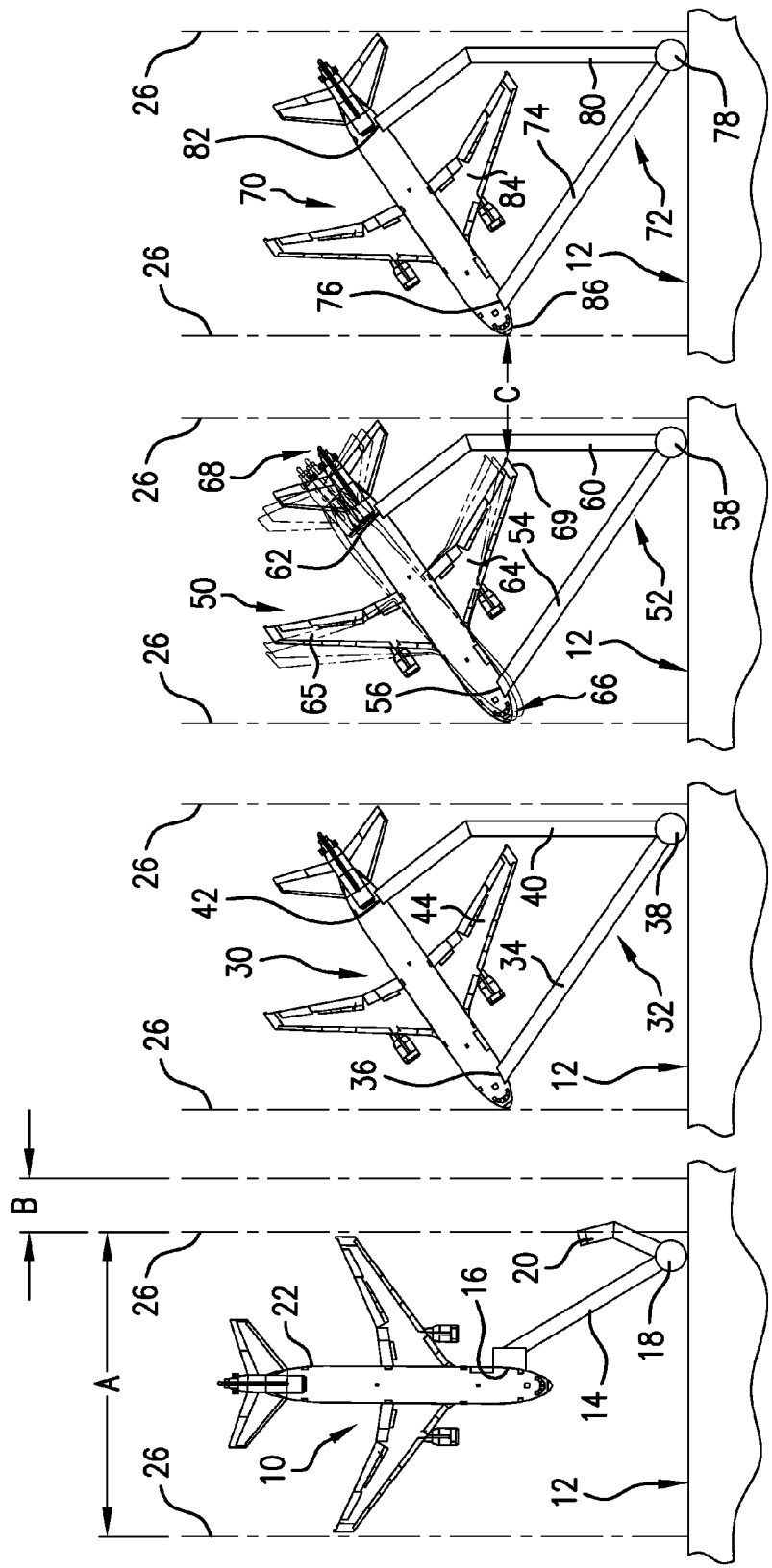

AIRCRAFT GATE PARKING AND SERVICING METHOD

PRIORITY CLAIM

This application claims priority from U.S. Provisional Patent Application No. 61/845,080, filed 13 Jul. 2013, the disclosure of which is fully incorporated herein.

TECHNICAL FIELD

The present invention relates generally to increasing the efficiency of airport gate and apron operations and particularly to a method for improving the ease and efficiency with which aircraft can be parked and serviced at virtually any airport, minimizing the time that aircraft spend at an airport gate.

BACKGROUND OF THE INVENTION

An aircraft that is parked at a gate is not only delaying passengers, but is also not earning revenue from the transport of passengers or crew. Considering the value of passenger inconvenience and the capital costs of aircraft, delays may represent a significant expense for airlines. Not only can even a few extra minutes an aircraft is on the ground reduce airline revenues, but this additional time may adversely affect an airline's daily schedule. Currently, an aircraft is required to maneuver under the power of one or more of its main engines into a parking location at a terminal and park in a "nose-in" orientation, with the aircraft longest axis located perpendicular to a terminal building or gate, or, alternatively, an aircraft is towed into a parking location in this orientation. Typically, once the aircraft's engines have been shut down, a single passenger boarding or loading bridge is moved into place to align with and connect to an aircraft's forward door so that passengers may leave the aircraft and walk to the terminal gate. Ground service vehicles may also then approach the aircraft to provide various aircraft gate services, including transferring baggage and cargo, supplying fresh water and catering supplies, removing waste water, and the like. When the aircraft is ready for departure, passengers are boarded through the loading bridge, ground service vehicles leave the vicinity of the aircraft after service is completed, and a tug or tow vehicle is attached to the aircraft when pushback clearance is received. The aircraft is pushed in reverse by the tug to a location where the aircraft can start one or more of its engines and move in a forward direction to a takeoff runway.

The airline industry has recognized the importance of efficiently unloading and loading passengers and providing the requisite servicing of aircraft so aircraft can be turned around as quickly as possible to maintain the airline's flight schedule and achieve the highest aircraft utilization possible. Moreover, an airline's revenue and potential profits may be increased the less time an aircraft is on the ground and the more time it is in flight transporting passengers and crew. Every minute by which an aircraft's turnaround time is reduced increases time the aircraft may be in flight, in turn minimizing passenger inconvenience due to delays and increasing airline revenue. While estimates of the specific amount of airline cost savings that may be achieved for each minute aircraft turnaround time is reduced may vary, it is generally acknowledged that these savings are potentially substantial.

Ideally, aircraft should be able to park at any airport so that transfer of passengers and baggage and servicing of the aircraft may be accomplished in a manner that minimizes turnaround times and maximizes ease of operation for a pilot taxiing into a terminal gate. This is not always the reality, however, and the ease and efficiency of aircraft parking and servicing and, therefore, turnaround time and the predictability of turnaround time vary widely. Improvements in aircraft gate parking, servicing, and turnaround efficiency and predictability that reduce airlines' operating costs continue to be proposed. While proposed approaches to improving the efficiency of aircraft parking, passenger transfer, and aircraft servicing have had some success, additional reductions in the time an aircraft spends on the ground have remained elusive. Consequently, current predictions of aircraft turnaround time are not as accurate as desired.

Airport terminal parking spaces for aircraft must be designed to ensure that a minimum apron space is available around each aircraft. This minimum space must accommodate not only passenger loading bridges, but also ground service vehicles and equipment, while satisfying Federal Aviation Administration (FAA) and corresponding international regulatory agency requirements. Aircraft wing tip clearance requirements, in particular, must be strictly observed to avoid contact between adjacent aircraft during taxi-in or tow-in and pushback. The aircraft parking method and system described by Hutton in U.S. Pat. No. 6,914,542, for example, focuses on maintaining adequate wing tip clearance for different aircraft types parking at an airport terminal equipped with a single loading bridge for reach aircraft.

To increase the efficiency with which passengers can be moved out of and into aircraft, especially very large aircraft that have multiple entrances and passenger levels, some airport terminal gates have two loading bridges available for such aircraft that can be extended horizontally and/or vertically to service aircraft using two different doors simultaneously. In one arrangement, an "over-the-wing" bridge is designed to be connected to an aircraft's rear door while a conventional loading bridge is connected to a forward door to provide two passenger loading bridges for Airbus 319-321, Boeing 737, and similar aircraft when the aircraft is parked perpendicular to an airport terminal gate. Such an arrangement with over-the-wing loading bridges is described in U.S. Pat. No. 7,039,978 to Hutton. Over-the-wing loading bridges are available from FMT Aircraft Gate Support Systems of Sweden and other suppliers and have been installed at many airports. This type of passenger loading bridge must be designed to clear the aircraft wing height, also allowing for the height of winglets. In addition, maneuvering the bridge over the aircraft wing into place to accurately align with and connect to an aircraft rear door may take more time than maneuvering a bridge that does not have to be moved into place over an aircraft wing to align with an aircraft door located rear of a wing. Although intended to improve passenger transfer efficiency, the additional time that may be required to extend, connect, disconnect, and retract an over-the-wing loading bridge may increase, rather than decrease, turnaround time. Even when over-the-wing loading bridges are designed to include sensors and to be moved into and out of place automatically to minimize time required for connection and disconnection, the height of such loading bridges above an aircraft wing requires careful monitoring as they are maneuvered into place above an aircraft wing. Over-the-wing loading bridges have been involved in accidents, including at least one in which an aircraft wing was hit and damaged when the loading bridge collapsed during its extension to connect with the aircraft aft door. As a result of the possibility of aircraft wing damage and for other reasons that appear to be related to cost-effectiveness, use of over-the-wing loading bridges is not as widespread as initially hoped, at least in the United States.

Another type of dual passenger loading bridge system is described and shown in U.S. Pat. Nos. 7,275,715 and 7,614,585, assigned to Boeing. This complex system, which is also designed to be used with an aircraft parked perpendicular to a terminal building in a "nose-in" orientation, may also include structure for handling baggage and cargo and for providing some aircraft utilities. The Boeing system has an arrangement of lateral bridge extensions that are required to connect one or more main bridge sections to doors on one or both sides of the aircraft. Although the intent of a dual passenger loading system, such as the Boeing system and the over-the-wing type of system, is to allow faster passenger egress and ingress, the practice when dual loading bridges are available has been to use one loading bridge for first and business class passengers and the other for economy class passengers.

For a number of years, aircraft utilities have been attached to passenger loading bridges and connected to aircraft to supply, for example, electric power, temperature and humidity-conditioned air, and compressed air to an aircraft at a gate during the turnaround process. In U.S. Pat. No. 3,521,316, Adams et al describes providing these utilities to an aircraft concurrently with passenger boarding. The service transport unit described by McEntire et al in U.S. Pat. No. 5,149,017 includes a utility bundle attached to and designed to extend and retract with a passenger loading bridge, and the loading bridge-mounted heat exchanger with extensible supply and return lines described by Shepheard in U.S. Pat. No. 4,620,339 provide utilities to a parked aircraft. The foregoing arrangements avoid the need for providing such aircraft services by separate conduits or connections not associated with a landing bridge and reduce the numbers of such structures in a terminal gate area. U.S. Pat. No. 5,505,237 to Magne discloses a partially or completely automated aircraft refueling installation integrated into a passenger loading bridge to eliminate or reduce the need for fuel vehicles in a gate area. Improving aircraft gate turnaround by increasing the efficiency of gate services is not a stated goal of the systems in these patents.

The loading bridge arrangements known in the art, including those described above, whether or not aircraft utilities are connected with the loading bridge, are all premised on providing connections with aircraft that are parked in a "nose-in" orientation relative to an airport terminal building so that the longest axial dimension of the aircraft is oriented perpendicular to the terminal building. Consequently, passenger loading bridges are constructed to that they can be extended between the terminal and the aircraft at an angle that will align with an aircraft door, usually a forward door on a side of the aircraft closest to the loading bridge, to provide an effective connection. Many passenger loading bridges have rotundas or the like that can rotate and thus facilitate the connection between a loading bridge and an aircraft door, but alignment may still pose challenges.

Parking an aircraft so that the longest axial dimension is parallel to a terminal building avoids the need for an over-the-wing type of loading bridge and simplifies the extension and alignment of dual passenger loading bridges with aircraft doors. At airport terminals designed to accommodate wide body aircraft, this type of arrangement may work very effectively to improve aircraft gate efficiency and minimize turnaround time. Loading bridges can be easily aligned and directly connected with both forward and rear doors on a side of the aircraft facing the terminal. Required minimum clearances can also be maintained. Not every airport has gates designed to accommodate wide body aircraft, however, and the gate servicing efficiencies possible when aircraft are parked parallel to a terminal gate cannot be realized because aircraft cannot be parked in a parallel orientation and maintain required clearances.

A need exists, therefore, for an improved method for parking and servicing aircraft at airport terminal gates in an alternative orientation that achieves the benefits and time savings possible when an aircraft is parked in a parallel orientation while conforming to minimum parking clearances for airport parking spaces designed to accommodate narrow body and similarly sized aircraft. A need further exists for a method for parking aircraft in an optimum parking orientation within gate clearances that facilitates alignment and connection of passenger loading bridges with aircraft doors located rear of an aircraft wing that overcomes the disadvantages associated with aligning and connecting over-the-wing loading bridges to rear aircraft doors.

SUMMARY OF THE INVENTION

It is a primary object of the present invention, therefore, to provide an improved aircraft gate parking and servicing method that achieves the benefits and time savings of parking an aircraft parallel to an airport terminal gate and meets clearance requirements without requiring the additional space needed to move the aircraft into and out of a parallel parking orientation.

It is another object of the present invention to provide an improved aircraft gate parking and servicing method for parking aircraft in an optimum parking orientation within gate clearances that facilitates alignment and connection of passenger loading bridges with aircraft doors located rear of an aircraft wing that overcomes the disadvantages associated with aligning and connecting over-the-wing loading bridges to rear aircraft doors.

It is another object of the present invention to provide an improved aircraft gate parking and servicing method that employs at least two passenger loading bridges that may be aligned and connected directly with forward and rear aircraft doors on a side of the aircraft closest to a terminal gate that maneuvers a loading bridge or bridges connecting to rear aircraft doors past an aircraft wing around and behind, rather than above and over, the wing.

It is an additional object of the present invention to provide an improved aircraft gate parking and servicing method wherein dual passenger loading bridges are adapted to provide aircraft utilities and/or services concurrently with passenger egress and ingress.

It is a further object of the present invention to provide an improved aircraft gate parking and servicing method wherein the speed of passenger egress and ingress is maximized by providing a combination of at least two passenger loading bridges adapted to support aircraft utilities and/or services connected to aircraft forward and rear doors and passenger stairs connected to aircraft doors not connected to loading bridges.

It is yet another object of the present invention to provide an improved aircraft gate parking and servicing method that can be beneficially used by aircraft moved into and out of a optimum parking orientation at a gate by a range of methods including by an engines-off electric or autonomous taxi system, by the aircraft's main engines, and/or by an external tug or tow vehicle.

It is yet an additional object of the present invention to provide an improved aircraft gate parking and servicing method that enables an aircraft to maneuver efficiently into and out of an optimum parking orientation at a gate while maintaining required clearances with adjacent aircraft and gates.

It is yet a further object of the present invention to provide an improved aircraft gate parking and servicing method that safely moves a range of types of aircraft into and out of an airport terminal gate to park within required safety margins while minimizing the time the aircraft spends at the gate for passenger transfer and aircraft servicing.

It is yet an additional object of the present invention to provide ground level gate structure for an improved aircraft gate parking and servicing method that automatically turns an aircraft into and out of an optimum parking orientation to park the aircraft relative to a terminal gate so that passenger loading bridges may be easily maneuvered around and behind the aircraft wing to align and connect with aircraft rear doors located behind an aircraft wing as well as with a forward aircraft door.

It is a still further object of the present invention to provide an improved tug for an improved aircraft gate parking and servicing method designed to support and turn nose landing gear wheels to move an aircraft into an optimum parking orientation to park the aircraft relative to a terminal gate so that passenger loading bridges may be easily maneuvered around and behind the aircraft wing to align and connect with aircraft rear doors located behind an aircraft wing as well as with a forward aircraft door.

In accordance with the aforesaid objects, an improved aircraft gate parking and servicing method is provided wherein an aircraft may be safely driven or moved into an airport terminal gate parking space and parked in an optimum orientation relative to the gate and the location of passenger loading bridges to allow at least two loading bridges to be connected to aircraft forward and rear doors without requiring a loading bridge connected to a rear door behind an aircraft wing to extend over the wing, wherein loading bridges aligning and connecting with doors rear of the wing are designed to be easily and quickly maneuvered around and behind the wing to connect with rear doors. Passenger transfer and servicing of the aircraft may occur concurrently before the aircraft is maneuvered out of its optimum orientation in the parking space and driven to a takeoff runway for departure. At least the required minimum clearance margins are maintained at all times during aircraft gate maneuvers into and out of the optimum parking orientation. Time needed for aircraft turnaround may be reduced further by using stairs to provide service access, or possibly additional passenger access, to all doors not connected to loading bridges, or, at airports without loading bridges, using stairs at all aircraft doors. The present method is intended for use with any type or size aircraft. Ground level gate structure that is integral with a gate or movable, in the form of a tug specifically adapted for this purpose, may be provided to automatically turn aircraft to an optimum parking orientation that provides maximum access to aircraft doors behind the aircraft wing.

In a preferred embodiment of the present method, aircraft landing gear wheels are equipped with engines-off taxi systems for autonomous ground travel without reliance on the aircraft main engines or tow vehicles. Aircraft may also be moved into and out of an optimum parking orientation by the aircraft's engines or by an external tug or tow vehicle, including a tug specifically adapted to turn a wide body or other size aircraft in and out of the optimum parking orientation.

Other objects and advantages will be apparent from the following description, drawings, and claims.

BRIEF DESCRIPTION OF THE DRAWINGS

FIG. 1a is a diagrammatic representation of a conventional narrow body aircraft parked in a typical nose-in orientation at an airport terminal gate that is equipped with dual passenger boarding bridges;

FIGS. 1b-1d are diagrammatic representations of adjacent narrow body aircraft parked in an optimum parking orientation in accordance with the present invention, wherein FIG. 1c illustrates the movements required to maneuver into and out of the optimum parking orientation.

DESCRIPTION OF THE INVENTION

Figure 2B:
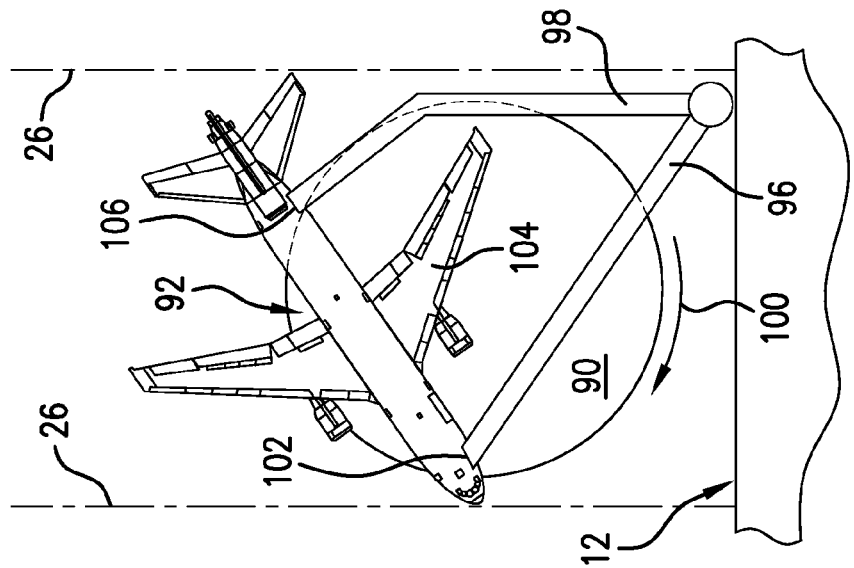
FIGS. 2a and 2b are diagrammatic representations of one type of ground level gate structure that may be provided and used in accordance with the present invention to precisely turn an aircraft into and out of the optimum parking orientation.

As noted above, minimizing the time an aircraft must spend parked at a gate to unload and load passengers and baggage and to be serviced maximizes the time and aircraft can be in flight, which, in turn, leads to reduced aircraft operating costs and increased airline savings. Every minute that can be saved affects this balance. Consequently, airlines continually review actions that may be taken and procedures that may be implemented to minimize, within established safety parameters, an aircraft's turnaround time. Since modifications to existing airport terminal gates and the construction of new terminal facilities are usually very costly and time consuming, airlines and airport operators prefer more economically feasible options. Methods for improving the efficiency of and reducing the time for aircraft gate operations that may be implemented within existing gate space are more desirable because of their likely lower cost than those that require additional infrastructure. Until the present invention, however, an improved aircraft gate parking and servicing method capable of achieving airlines' objective of minimizing aircraft gate turnaround time with minimal or no additional cost has not been available. The preferred embodiment of the improved aircraft gate parking and servicing method of the present invention may be implemented with minimal or no airport terminal gate structural changes, beyond what is required to modify passenger loading bridges, at an estimated 80-100% of existing airports to enhance gate operations efficiency and achieve significant reductions in aircraft turnaround time.

The inventors of the present invention recognized that significant efficiencies in airport gate operations are possible when an aircraft is parked parallel to a terminal. These efficiencies are described in co-pending International Application No. PCT/US13/72508, filed 29 Nov. 2013, entitled Airport Terminal Aircraft Gate Traffic Management System, the disclosure of which is fully incorporated herein by reference. Additional efficiencies that may be achieved when an aircraft is parked parallel to a terminal are further described in commonly owned co-pending International Application No. PCT/US14/45815, filed 8 Jul. 2014, entitled System and Method for Improving Efficiency of Aircraft Gate Services and Turnaround, the disclosure of which is fully incorporated herein by reference. Maneuvering an aircraft into and out of a parking orientation that is parallel to a terminal and remains within mandated safety margins, however, requires a larger gate space than may be available at airports that do not service wide body aircraft. The present invention provides an improved aircraft gate parking and servicing method that may be used effectively and efficiently to minimize turnaround time with minimal, or no, changes to gates at airports where gate parking spaces are limited by the safety margins defined for narrow body aircraft, such as, for example, Boeing 737-800 and similarly sized aircraft. The present invention additionally provides an improved aircraft gate parking and servicing method that may be used effectively for wide body and other aircraft types to maximize passenger access to aircraft doors rear of the aircraft wing with or without structural modifications to an aircraft gate parking area.

In accordance with the present method, aircraft are driven or towed to an airport apron or gate parking area and maneuvered into an optimum orientation relative to a terminal gate and loading bridge location for efficient passenger transfer and aircraft servicing. The optimum parking orientation and/or optimum orientation described herein is an aircraft parking orientation relative to an airport terminal and/or gate and loading bridge locations that positions an aircraft in an optimum location and at an optimum angle where maximum use may be made of the aircraft's doors. This method facilitates access to an aircraft's doors that are located behind or rear of the wing, and enables loading bridges to be quickly and efficiently moved around and behind the aircraft wing facing the terminal to align with and connect to doors rear of the wing.

Referring to the drawings, which are not drawn to scale, FIG. 1a shows a typical narrow body aircraft 10 parked at a terminal 12 with a passenger loading or boarding bridge 14 connected to the aircraft at the location of a forward door 16. Passengers may be transferred between the aircraft 10 and the terminal 12 through the loading bridge 14, which is shown connecting with the terminal through a rotunda structure 18. Other loading bridge-terminal connecting structures may also be used, or a loading bridge may be connected directly to the terminal. A second passenger loading or boarding bridge 20 may be connected to the rotunda 18 as shown, directly to the terminal 12, or in any other convenient manner. The only way to connect the passenger loading bridge 20 to the rear aircraft door 22 when the aircraft 10 is in the nose-in orientation perpendicular to the terminal 12 shown in FIG. 1a is to extend the loading bridge 20 over the aircraft wing 24. This requires a specifically designed over-the-wing loading bridge design, such as one of the structures discussed in the Background of the Invention section above. Not only are over-the-wing loading bridges significantly more costly than a loading bridge that does not have to be designed to be carefully maneuvered into place over an aircraft wing, but the time required to accurately position the loading bridge over the aircraft wing 24 and align the loading bridge with the aircraft rear door 22 and then retract the loading bridge after passenger transfer is complete may increase the amount of time the aircraft is at the gate. The aircraft 10 in FIG. 1a is using only one of its four doors to move passengers into and out of the aircraft, which is a very inefficient method for transferring arriving passengers from the aircraft to the terminal. Departing passengers must wait to be transferred from the terminal to the aircraft until at least after all of the arriving passengers have deplaned.

FIG. 1a illustrates, in addition, the minimum gate clearance and safety margins required by the FAA for a narrow body aircraft. Distance A represents a minimum width of a terminal gate intended for use by narrow body aircraft, which is 118 feet, the width of a Grade III narrow body equivalent gate (NGEG). A Boeing 737-800 narrow body aircraft, for example, is 112 feet, 7 inches wide and is easily accommodated within the gate width distance A. Distance B represents a required safety margin distance between gates, which is 23 feet. The safety margin distance is intended to ensure that the wings of adjacent aircraft are not close enough to make contact when the aircraft are driven into and pushed out of adjacent gates. The total width between centerlines of adjacent aircraft when the gate is 118 feet wide is 141 feet (A+B). The significance of these dimensions will be apparent in the discussion of the optimum parking orientation below.

FIGS. 1b-1d illustrate the method of the present invention when dual passenger loading or boarding bridges are located at adjacent terminal gates. Other loading bridge configurations (not shown) are also possible and may be used in the present method. Additional numbers of loading bridge sections or extension may be provided, for example, and each loading bridge or loading bridge section may be connected directly to the terminal. In FIGS. 1b and 1d, aircraft 30 and 70 are shown parked, and in FIG. 1c, the turning movement of aircraft 50 is represented. The optimum parking orientation referred to above is shown in FIGS. 1b-1d. In the optimum parking orientation of the present invention, an aircraft is positioned with the nose end at about a 45° angle past a longitudinal axis of the nose-in aircraft 10 that is parked perpendicular to the terminal 12 in FIG. 1a. The aircraft in FIGS. 1b-1d, viewed from above, extend diagonally between the safety margin boundaries of each gate. In this orientation, the longitudinal axis or longest dimension of the aircraft is about half way between perpendicular to and parallel to the terminal 12. The specific angle may vary somewhat, depending on the width of the gate and the length and turning radius of the aircraft. A larger or smaller angle may be needed to accommodate different models of narrow body aircraft or to accommodate wide body aircraft. The effect of this aircraft parking orientation on the efficiency of aircraft gate servicing will be explained in more detail below in connection with FIGS. 1b-1d.

Referring to FIG. 1b, one suitable type of dual passenger loading bridge 32 useful with the present invention may have a section 34 that connects to a forward door 36 of the aircraft 30 and to a rotunda or equivalent structure 38, which is attached to the terminal 12 to provide a path between the terminal and the aircraft forward door 36. A second loading bridge section 40, which may be articulated as shown or any other suitable design, may extend from the rotunda 38, or from a separate connection (not shown) directly from the terminal 12, around and behind an aircraft wing 44 facing the terminal to a rear aircraft door 42. Although only one rear door is shown behind the wing 44, some types of aircraft may have multiple doors beyond the wing toward the rear of the aircraft.

Passenger loading bridges with the aforementioned dual section configuration are currently in use at many airports, including, for example, Schipol Airport in Amsterdam, and are used for connection to Airbus 380 aircraft. Loading bridges designed to connect to an aircraft rear door in current use, however, are typically the more complex over-the-wing type of loading bridges described above. Other passenger loading bridge designs than those shown and described herein may also be used to connect the terminal to forward and rear aircraft doors without extending over and above an aircraft wing and are contemplated to be within the scope of the present invention.

The angle of orientation of the aircraft 30 with respect to the terminal 12 and the location of the dual loading bridge 32 permits the connection of the loading bridge section 40 to the aircraft rear door 42 without going over and above the aircraft wing 44. As a result, a much simpler, easier to manipulate loading bridge design can be used to provide passenger access between the terminal and the aircraft. This simpler loading bridge design may be connected to and disconnected from an aircraft rear door 42 in less time than may be possible with available over-the-wing loading bridges since the loading bridge 40 may be maneuvered in a more direct path around and behind the wing 44. If an aircraft has additional doors behind and/or beyond its wings, additional loading bridge sections or loading bridges may also be provided for connection to these doors. An additional loading bridge operator may be needed to maximize the efficiency operation of this arrangement of loading bridges.

An aircraft 50 adjacent to aircraft 40 is shown in FIG. 1c. A dual passenger loading bridge 52, which may be identical to the loading bridge 32 as shown or which may be a different design that serves the same purpose, connects the aircraft 50 to the terminal 12. A loading bridge section 54 extends between an aircraft forward door 56 and a terminal-contacting structure 58, and a second loading bridge section 60 extends between the terminal-contacting structure 58 and an aircraft rear door 62. The rear door loading bridge section 60 is configured to connect with the rear door 62 without contacting the aircraft wing 64 and is moved around and behind the wing 62 as described above. As in FIG. 1b, the aircraft 50 is parked so that it is located between the safety margin boundaries 26 of its gate.

Movement of the aircraft 50 within the gate width A is represented by the series of phantom lines around the aircraft 50 showing the relative positions of the wings 64 and 65, the nose 66, and the tail 68 of the aircraft 50 as the aircraft turns into and out of an optimum parking orientation. The aircraft 50 will be driven or towed into an assigned gate in a nose-in orientation with the longitudinal axis of the aircraft perpendicular to the terminal 12, as shown in FIG. 1a. Instead of stopping and parking in that orientation, the aircraft is turned so that the nose end 66 and the tail end 68 extend diagonally across the width of the gate as shown in FIGS. 1b-1d before the aircraft is stopped to park in this location. When passenger and baggage transfer and gate servicing have been completed, and the aircraft is cleared for departure, the aircraft will be turned so that it is in a nose-in perpendicular orientation with the nose end 66 pointed toward the terminal 12 and the tail end 68 pointed away from the terminal 12. The aircraft may then be moved in reverse away from the terminal to a location where the aircraft can turn and move in a forward direction to a takeoff runway.

It is preferred to provide cameras (not shown) located on the aircraft exterior in positions that enable a pilot driving the aircraft to have a full view of the aircraft's ground environment so that the aircraft may be safely and accurately turned and moved in reverse. A ground marshaller may also be provided to assist with aircraft turning and reverse movement. Since all aircraft movement near a terminal occurs between the safety margin boundaries 26, the locations of ground vehicles and personnel may be more important than the locations of adjacent aircraft when a pilot is turning and reversing an aircraft.

If the passenger loading bridges or services at an airport are located on an opposite side of a gate area from that shown, the aircraft 50 may need to turn in an opposite direction from that shown. In this case, loading bridges may be connected to forward and rear doors on the opposite side of the aircraft from that shown. Other adjustments may be required to position an aircraft to maximize the efficiency with which loading bridges are connected to and disconnected from the aircraft and services are provided. Additionally, as discussed above, stairs may be provided at aircraft doors not connected to loading bridges.

FIG. 1d is similar to FIG. 1b and shows an aircraft 70 parked in an optimum orientation for efficient passenger transfer and gate servicing of the present invention. As in FIG. 1b, a preferred dual passenger loading bridge 72 may have a section 74 that connects to a forward door 76 of the aircraft 70 and to a rotunda or equivalent structure 78, which is attached to the terminal 12 to provide a path between the terminal and the aircraft forward door 76. A second loading bridge section 80, which may be articulated as shown or any other suitable design, extends from the rotunda 78, or directly from the terminal, around and behind aircraft wing 84 to a rear aircraft door 82 located behind the wing 84. The angle of orientation of the aircraft 70 with respect to the terminal and the location of the dual loading bridge permits the connection of the loading bridge section 80 to the aircraft rear door 82 without going over and above the aircraft wing 84. FIG. 1d illustrates the clearance, represented by distance C, between the nose end 86 of the aircraft 70 and the tip 69 of the wing 64 of adjacent aircraft 50 while aircraft 50 is moving and turning to maneuver into and out of an optimum parking orientation in accordance with the method of the present invention. This distance is about 36 feet, which is the closest distance between the two aircraft while aircraft 50 is turning. If aircraft 30, 50, and 70 are parked in the perpendicular nose-in orientation of aircraft 10, the clearance between wing tips of adjacent aircraft would be the 23 foot safety margin, distance B. Consequently, a greater clearance is possible with the optimum parking orientation of the present parking method.

The efficiency of passenger transfer may be further increased when a combination of loading bridges and stairs are used to access simultaneously all of an aircraft's doors. Doors on one side of an aircraft may accessed through loading bridges, as shown in FIGS. 1b-1d, while corresponding forward and rear access doors on the opposite side of the aircraft may be accessed by stairs that are integral to the aircraft or portable stairs moved into place by ground personnel. Alternatively, all of an aircraft's doors may be connected to stairs, which may permit gate space to be used even more efficiently for passenger transfer and aircraft servicing, although an aircraft may need to be further from the terminal to allow more space for movement. This enables airports without passenger loading bridges to take advantage of the turnaround time savings and efficiencies possible with the present invention when aircraft are moved into and out of a gate without a tug. To further enhance efficiency of passenger transfer, passengers may be assigned to specific loading bridges and/or stairs to depart or board the aircraft. When an aircraft is moved by an engines-off taxi system, as described below, the use of stairs may lead to a relatively greater increase in passenger transfer efficiency. The time savings that accompany increased door usage with the present method, however, may offset time delays occasioned by the use of aircraft engines and/or tugs to move the aircraft into and out of an optimum parking orientation.

Additional efficiencies in gate servicing during turnaround are possible when aircraft gate services and/or utilities are supported by loading bridges so that when loading bridges are extended to connect with an aircraft, connections to services and/or utilities may be made simultaneously. Passenger transfer may occur concurrently with the provision of gate services. For example, fresh water and waste water conduits (not shown) may be supported by a loading bridge section, such as the loading bridge section 40, 60, or 80 in FIGS. 1b-1d, designed to connect to a rear aircraft door. A baggage conveyor (not shown) could be supported on another loading bridge section, such as the loading bridge section 34, 54, or 74, designed to be connected to a forward aircraft door or a door closest to a cargo hold, and adapted to access an aircraft cargo hold. Other selected services and/or utilities, including, but not limited to, electrical, conditioned air, fuel, and catering, may also be supported by or connected to a loading bridge and provided to an aircraft concurrently with passenger transfer. Providing gate services in this manner may potentially eliminate a number of ground service vehicles, minimizing ground congestion and enhancing the ease with which an aircraft may move into a gate and turn to park in an optimum orientation that enables maximum aircraft door use.

Additional efficiencies may be realized when various of the steps of the present method are designed to be conducted automatically. For example, loading bridges may be extended, aligned with and connected to aircraft doors, and then retracted automatically. Aircraft services provided in connection with loading bridges may also be automated. Other aspects of the present method may similarly be designed to be conducted automatically.

In a preferred embodiment of the present method, an aircraft is moved into a gate area, turned to park in the optimum parking orientation, and moved in reverse out of the gate area autonomously under the control of an aircraft pilot without reliance on the aircraft main engines or a tow vehicle or tug. To achieve maximum efficiency of airport gate operations and to minimize aircraft turnaround time, aircraft may be equipped with an engines-off taxi system, preferably an electric taxi system. In a preferred type of engines-off electric taxi system, an electric drive means or electric drive motor is mounted to power one or more landing gear wheels to rotate at an optimum torque to drive the aircraft autonomously on the ground without reliance on aircraft main engines or tow vehicles. A preferred location for an electric drive means in an electric engines-off taxi system is the aircraft nose landing gear wheels. Providing an engines-off taxi system with drive means on one or more main landing gear wheels may also be suitable in some aircraft.

A preferred drive means is an electric motor assembly, preferably powered by the aircraft auxiliary power unit, that is capable of operating at a torque and speed required to move an aircraft landing gear wheel and, therefore, to move an aircraft autonomously on the ground. An example of one of a number of suitable types of drive means useful in an aircraft landing gear drive wheel that could be used effectively in the present improved aircraft gate parking and servicing method is an inside-out electric motor in which the rotor can be internal to or external to the stator, such as that shown and described in U.S. Patent Application Publication No. 2006/0273686, the disclosure of which is incorporated herein by reference. A range of motor designs capable of high torque operation across a desired speed range that can move a commercial-sized aircraft wheel and function as described herein may also be suitable drive means in the present system. A high phase order electric motor of the kind described in, for example, U.S. Pat. Nos. 6,657,334; 6,838,791; 7,116,019; and 7,469,858, the disclosures of the aforementioned patents being incorporated herein by reference, may be effectively used as a drive means. One particularly suitable drive means is a high phase order induction motor with a top tangential speed of about 15,000 linear feet per minute and a maximum rotor speed of about 7200 rpm, although drive means capable of a wide range of such speeds could also be used to drive an aircraft into and out of an optimum parking orientation in accordance with the present method.

The present improved aircraft gate parking and servicing method may also be used with aircraft that are driven conventionally using thrust from one or more of the aircraft's main engines to move the aircraft on the ground. The aircraft is driven into a gate nose-in with power from one or more aircraft main engines, and then the engines are used to move the aircraft sideways to turn it so that the aircraft can park in the optimum orientation shown in FIGS. 1b-1d and discussed herein. Additional time may be required before loading bridges may be connected and gate servicing may be started to ensure that the aircraft's engines have completely shut down and jet blast and/or engine ingestion do not pose risks. At least some of this time may be recouped by the more efficient passenger boarding possible with the loading bridge arrangement shown in FIGS. 1b-1d. The aircraft engines may also used to turn and reverse the aircraft to maneuver it out of the parking orientation after departure clearance has been received.

An additional method of moving an aircraft into and out of the optimum parking orientation may be done with a tug. A tug may be attached to the aircraft to tow it into a gate and then to turn the aircraft to position it in the optimum parking orientation described and shown herein. When the aircraft has been cleared for pushback, re-connection to a tug is required, which takes time. The tug will need to first move the aircraft from the diagonal orientation shown in the drawings to a nose-in perpendicular orientation so that the aircraft can be pushed straight back. Some airlines currently maintain a tug at each gate used by the airline, which would reduce the time involved in moving an aircraft from this airline with a tug. It is anticipated that time delays resulting from tug connection and disconnection when an aircraft arrives and tug re-connection and disconnection when an aircraft departs may be recouped by the time savings resulting from passenger boarding efficiencies produced by the use of dual loading bridges and the present improved method of connection with aircraft doors behind the aircraft wing.

Although the turnaround efficiencies and time reduction of the present method may be achieved with little or no modification to airport gates beyond that required for loading bridges, equivalent turnaround efficiency and time reduction may be accomplished when selected airport terminal gate infrastructure modifications are made. In an alternative embodiment of the present invention, in which a tug, an aircraft's engines, or an engines-off taxi system may be used to move an aircraft into and out of a gate, a small conveyor system, such as, for example without limitation, a roller or chain drive conveyor system, may be located at the tarmac surface in a gate area at a desired aircraft stopping location. The conveyor system may have an attached platform designed to receive and support an aircraft's nose landing gear wheels when the aircraft is towed or otherwise moved onto the platform. After the tug has been disconnected or the aircraft's movement has otherwise stopped, the aircraft nose landing gear may be attached to or engaged by the conveyor system, and the conveyor system may be operated to pull the aircraft nose end and turn it precisely so that the aircraft is parked in the optimum orientation shown in FIGS. 1b-1d. When passenger loading and aircraft servicing have been completed, the conveyor may be activated to turn the nose end of the aircraft back to a nose-in orientation, and the aircraft nose landing gear may be detached from the conveyor system so the aircraft may be pushed back from the gate. A suitable conveyor system may be designed to be installed at or slightly below the gate tarmac surface.

Figure 2A:
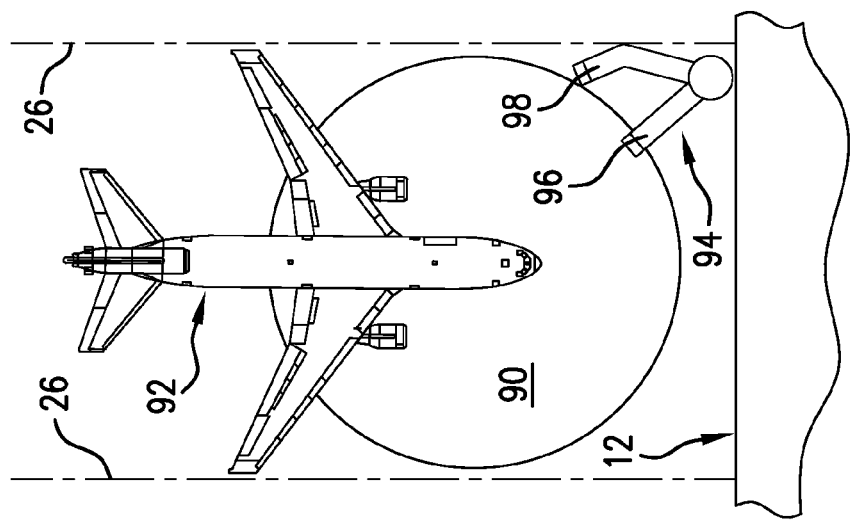

A further embodiment of the improved aircraft gate parking and servicing method of the present invention may also be employed to minimize turnaround time and to ensure that aircraft are moved as quickly and easily as possible into the optimum parking orientation described herein so that passenger loading bridges may be connected with aircraft forward and rear doors beyond the aircraft wing as quickly and easily as possible. This further embodiment, which is shown in FIGS. 2a and 2b, requires an airport to invest in structural modifications at gates. The time benefits, higher gate and aircraft utilization, improved safety, and lower insurance costs possible when these embodiments are implemented, however, will recapture this investment. This embodiment is most effectively implemented when an aircraft is driven into and out of a gate parking area with an engines-off electric taxi system or towed by a tug so that jet blast from operating aircraft main engines is not a consideration.

The embodiment of the present invention shown in FIGS. 2a and 2b improves the precision of aircraft parking in an optimum orientation that facilitates loading bridge alignment and connection and speeds passenger transfer and aircraft gate servicing. This arrangement may also require substantial modification of existing gate parking areas. As with the conveyor system described above, however, the improved turnaround efficiencies and reduced turnaround time possible with this embodiment should enable an airport's investment in the described modifications to be recovered. In the embodiment shown in FIGS. 2a and 2b, a rotatable platform 90, similar to a turntable and designed to support and turn a commercial sized aircraft, is built into a gate parking area. The diameter of the rotatable platform may be a dimension that will effectively support an aircraft and turn it at least between a nose-in orientation and a desired optimum parking orientation within the prescribed width of a terminal gate parking space, represented by lines 26. Rotating platforms or turntables capable of supporting and turning aircraft and other large, heavy vehicles are known in the art and may be adapted to function as described in the method of the present invention. U.S. Pat. No. 6,672,221 to Hadley, for example, describes a turntable that supports and turns aircraft, primarily in a hangar or storage area. The disclosure of this patent is incorporated herein by reference. An aircraft-supporting turntable available from the Australian Turntable Company is described to be designed to rotate any size aircraft up to an Airbus 380 and may be effectively employed with the embodiment of the present method illustrated in FIGS. 2a and 2b. These examples are not meant to be limiting; other rotating platform and/or turntable designs may also be employed.

An aircraft 92 may be driven by its engines-off electric taxi system or towed onto the rotatable platform 90, as shown in FIG. 2a so that aircraft's nose landing gear wheels and main landing gear wheels (not shown) are positioned on the rotatable platform. A dual passenger loading bridge 94, such as that described above in connection with FIGS. 1b-1d, is shown with loading bridge sections 96 and 98 in retracted positions near the terminal 12. The platform may then be rotated in the direction the arrow 100, as shown in FIG. 2b, until the aircraft is in an optimum parking orientation as described above in connection with FIGS. 1b-1d and may be secured as needed to maintain the aircraft in this orientation. A loading bridge section 96 may be connected to a forward door 102, and a loading bridge section 98 is easily moved around and behind an aircraft wing 104 to align with and connect to a rear aircraft door 106. As noted above, additional loading bridges may be provided to move into connection with additional aircraft doors behind or rear of an aircraft wing without requiring movement of the loading bridges over and above the wing. After the loading bridges are connected, passengers may be transferred, and the aircraft may be serviced. When the aircraft 92 is cleared for departure, the rotatable platform may be rotated in the opposite direction of arrow 100 so that the aircraft is in the perpendicular nose-in orientation of FIG. 2a. The aircraft may then be moved away from the gate as described above. A preferred rotatable platform 90 may be installed at tarmac ground level so that an aircraft may be easily driven or towed onto and off the platform surface. The rotatable platform 90 may be designed to be operated manually, but is preferably operated automatically to maximize efficiency.

The present method for improving aircraft gate parking and servicing has been shown and described in connection with the use of this method by narrow body aircraft to increase turnaround efficiency and reduce time required for turnaround. It may also be used to by wide body aircraft. Because wide body aircraft are used primarily to fly long distance or long haul flights without the turnaround frequency of narrow body aircraft that fly short and medium haul flights, reductions in turnaround time and increases in turnaround efficiency have not received the same attention for wide body aircraft as for narrow body aircraft. This could change if wide body aircraft were able to realize the turnaround efficiency and time reduction of the present method. When passenger demand and airport capacity exist, such as, for example, in Japan, wide body aircraft are being used for shorter flights. The method of the present invention described above may be used equally effectively with wide body aircraft as with narrow body aircraft. It may be necessary for wide body aircraft to make a sharper turn than is required by narrow body aircraft to park the aircraft at an optimum parking position and angle to facilitate loading bridge connections, as shown in FIGS. 1b-1d and 2b, around and behind an aircraft wing to connect with aircraft doors rear of the wing. In other respects, the improved aircraft gate parking and servicing method of the present invention would be the same for both types of aircraft and is capable of achieving increased turnaround efficiency and reduced turnaround times for both.

To facilitate use of the present method with wide body aircraft, a modified tug design (not shown) is proposed to assist a wide body, or other, aircraft to turn precisely and park in an optimum parking orientation so that loading bridges may be efficiently aligned with and connected to aircraft doors and may moved around and behind an aircraft wing to connect with aircraft doors located behind or rear of the wing. A tug designed to accomplish this is a two wheel type of nose landing gear lift tug that has one powered wheel positioned on each outer side of a pair of nose landing gear wheels and does not require a tow bar for attachment to the aircraft nose gear. The tug is designed to turn at the same angle as the nose gear as one tug wheel rotates in a forward direction and the other tug wheel rotates in an opposite, or backward, direction. Additional wheels, that are preferably not powered and are swiveled, may be provided on the lift tug for balance. Two additional swiveled wheels are preferred. The tug is designed to provide the tractive weight required to turn the aircraft. To achieve turning precision, the tug may be calibrated to 0° when it is attached to the aircraft, and the aircraft is in an initial nose-in orientation. In this orientation, one powered wheel may be prevented from spinning a selected number of rotations more than the other powered wheel, which prevents overturning the nose wheels when the tug turns the aircraft to an optimum parking angle. The tug may be used to return the aircraft to a nose-in orientation when passenger transfer and servicing are complete. Some time may be required to attach and detach this tug. The time savings possible as a result of improved efficiency and reduced passenger transfer time are likely to compensate for this, however. It is also possible to use such tugs on each of the sets of main wheels. Use of this type of tug on an aircraft's main wheels is more complex, however, and may not necessarily be offset by the reduced passenger transfer time.

While the present invention has been described with respect to preferred embodiments, this is not intended to be limiting, and other arrangements and structures that perform the required functions are contemplated to be within the scope of the present invention.

INDUSTRIAL APPLICABILITY

The improved aircraft gate parking and servicing method of the present invention will find its primary applicability where it is desired to park an aircraft to facilitate access to a maximum number of aircraft doors, particularly doors behind and rear of an aircraft wing, to increase the efficiency and reduce the time with which passengers may be transferred and an aircraft may be serviced, thereby reducing time spent by the aircraft on the ground.

The invention claimed is:

1. A method for improving aircraft gate parking and servicing comprising:
  a. at an airport terminal with a plurality of gate parking areas, each of the plurality of gate parking area having a width defined to include safety margins between adjacent gate parking areas when aircraft are parked in a nose-in orientation at the adjacent gate parking areas, moving an aircraft into a selected gate parking area in a nose-in orientation with a longest axis of the aircraft perpendicular to the airport terminal;
  b. turning said aircraft from the nose-in orientation to park completely within said defined width of said selected gate parking area in an optimum parking orientation relative to said terminal with the longest axis of the aircraft positioned at an optimum parking angle selected to facilitate access to doors of said aircraft rear of a wing of said aircraft on a terminal side of said aircraft and so that a clearance distance between the aircraft nose and a wing of an aircraft parked in an adjacent gate parking area is greater than the defined safety margins;
  c. connecting dual flexibly extendible passenger loading bridges extendible from a single airport terminal access point directly to a forward door and a rear door on the terminal side of said aircraft by extending a first passenger loading bridge to the forward door and extending a second passenger loading bridge around and toward the rear of the aircraft wing without extending over an aircraft wing to reach said rear door;
  d. transferring unloading and loading passengers simultaneously through the forward and rear doors and the loading bridges between said aircraft and said airport terminal to unload and load said aircraft concurrently while gate services are being provided to said aircraft; and
  e. when said aircraft has been cleared for departure, maneuvering said aircraft out of said optimum parking orientation by turning the aircraft from the optimum parking angle to the nose-in orientation completely within the defined width of said selected gate parking area and moving said aircraft in a reverse direction out of said selected gate parking area.

2. The method of claim 1, further comprising moving, turning, and maneuvering said aircraft into, within, and out of said selected gate parking area by controlling an engines-off taxi system controllable by a pilot of the aircraft to move said aircraft on a ground surface without operation of said aircraft main engines or a tow vehicle to park said aircraft in said optimum orientation at the optimum parking angle.

3. The method of claim 1, further comprising moving, turning, and maneuvering said aircraft into, within, and out of said selected gate parking area by controlling operation of one or more of said aircraft main engines to move said aircraft on a ground surface or by attaching said aircraft to a tug, whereby said aircraft is moved into said selected gate parking area and turned by said one or more main engines or by said tug to park in said optimum parking orientation at the optimum parking angle, and said aircraft is turned and pushed back out of said optimum parking orientation by said one or more main engines or said tug to move said aircraft out of said selected gate parking area.

4. The method of claim 3, further comprising attaching a tug designed to lift an aircraft's nose landing gears wheels out of contact with a ground surface, and controlling the tug to move, turn, and maneuver said aircraft into and out of said selected gate parking area, wherein the aircraft is turned by the tug to park in said optimum parking orientation and, when the aircraft is cleared for pushback, the aircraft is turned and pushed back out of said optimum parking orientation by the tug and the tug is removed from the aircraft.

5. The method of claim 1, further comprising omitting step c. and connecting stairs between all front and rear doors on said aircraft and the selected gate parking area ground surface to enable maximum passenger and service access to said aircraft.

6. The method of claim 1, further comprising providing one or more aircraft gate services or utilities supported by one or both of said first and said second passenger loading bridge, and connecting and disconnecting the one or more selected aircraft services to and from said aircraft when the first and second passenger loading bridges are connected to and disconnected from said aircraft.

7. The method of claim 1, wherein the defined width including the safety margins of each said selected gate parking area is sized to accommodate a widest dimension of a narrow body aircraft or a widest dimension of a wide body aircraft when said aircraft is oriented in the nose-in orientation with a longitudinal axis perpendicular to said airport terminal and to maintain said clearance distance when said aircraft is turned to the optimum parking angle.

8. The method of claim 1, further comprising providing at a selected location within said gate parking area a tarmac level conveyor system designed to engage a nose end of said aircraft, engaging said nose end, and turning said aircraft to park in said optimum parking orientation at the optimum parking angle.

9. The method of claim 1, further comprising providing within said gate parking area a tarmac level rotatable platform adapted and sized to support and turn an aircraft completely within the defined width of said selected gate parking area, moving said aircraft onto said rotatable platform in the nose-in orientation so that both nose landing gear wheels and main landing gear wheels of the aircraft are supported entirely by said rotatable platform, turning said rotatable platform a distance corresponding to said optimum parking angle and in a direction that facilitates extension of the first and second passenger loading bridges to connect simultaneously with both forward and rear doors on the terminal side of the aircraft, parking said aircraft in said optimum parking orientation at the optimum parking angle, and when passenger transfer and aircraft servicing are completed, turning said rotatable platform in an opposite direction so that said aircraft is in a position in the nose-in orientation to be moved in reverse out of said selected gate parking space.

10. An aircraft gate parking and servicing method at an airport terminal with a plurality of adjacent aircraft gate parking areas, comprising:
  a. defining a plurality of adjacent aircraft gate parking areas at an airport terminal, wherein each of the plurality of gate parking areas has a width including safety margins between adjacent gate parking areas when an aircraft is parked in a nose-in orientation with a longest axis of the aircraft perpendicular to the airport terminal in each of said plurality of adjacent gate parking areas;

b. providing at least two extendible and retractable passenger loading bridges attached at a single location to the airport terminal for each of the plurality of adjacent aircraft gate parking areas;

c. driving an aircraft equipped with a pilot-controlled engines-off electric taxi system into one of the plurality of aircraft gate parking areas in the nose-in orientation and then controlling the engines-off taxi system to turn the aircraft completely within the width of the gate parking area from the nose-in orientation to an angled orientation wherein the longest axis of the aircraft is positioned at a location and parking angle relative to the airport terminal selected to facilitate attachment of the at least two extendible and retractable passenger loading bridges to a front aircraft door and to a rear aircraft door without extending over the aircraft wing, and extending the at least two passenger boarding loading bridges to connect at least one of the passenger loading bridges to the front aircraft door and to connect at least another of the passenger loading bridges to the rear door around and behind the aircraft wing without extending the at least another passenger loading bridge over the aircraft wing;

d. transferring passengers out of and into the aircraft through both front and rear aircraft doors and into and out of the airport terminal through the passenger boarding bridges connected to the front and rear aircraft doors, and when passenger transfer has been completed and the aircraft is ready for departure and pushback, retracting the at least two passenger boarding bridges; and e. controlling the engines-off electric taxi system to turn the aircraft completely within the width of the gate parking area from the angled orientation to the nose-in orientation and to drive the aircraft in reverse in the nose-in orientation out of the aircraft gate parking area away from the airport terminal.

11. The method of claim 10, further comprising providing access to a maximum number of aircraft front and rear doors by providing stairs and connecting the stairs between all aircraft front and rear doors not connected to the at least two passenger loading bridges and the aircraft gate parking area ground surface, and simultaneously transferring passengers out of and into the aircraft through the at least two passenger loading bridges and by the stairs.

12. The method of claim 10, further comprising driving a plurality of the aircraft equipped with engines-off electric taxi systems into adjacent ones of the plurality of adjacent aircraft gate parking areas with at least two extendible and retractable passenger loading bridges attached at a single location to the airport terminal and turning and parking each of the plurality of aircraft within the defined safety margins in each of the plurality of adjacent aircraft gate parking areas in the angled orientation so that a clearance distance between a nose end of one of said plurality of aircraft parked in one gate parking area and a closest wing tip of another of said plurality of aircraft parked in an adjacent gate parking area is greater than the safety margin between adjacent gate parking areas.

* * * * *